Nov. 20, 1956 W. A. ANDERSON ET AL 2,771,556

SAW-TOOTH GENERATOR

Filed Dec. 31, 1953

INVENTORS: W. A. ANDERSON
C. W. HARRISON

BY Hugh S. Wertz

ATTORNEY 2,771,556
Patented Nov. 20, 1956

2,771,556

SAW-TOOTH GENERATOR

William A. Anderson, Middlesex, and Charles W. Harrison, Gillette, N. J., assignors to Bell Telephone Laboratories, Incorporated, New York, N. Y., a corporation of New York Application December 31, 1953, Serial No. 401,528

5 Claims. (Cl. 250—36)

This invention relates to signal generators and particularly to signal generators for producing sawtooth waveforms.

Sawtooth waves are particularly useful in producing beam deflection in cathode ray tubes adapted, for example, for television use. In such cathode ray tubes, each cycle of beam deflection comprises a sweep portion which moves the beam at a relatively slow and uniform speed from one side of the face of the tube to the other and a flyback portion which returns the beam at a relatively fast speed to the starting side of the face of tube. Hence, waveforms used in the television art to produce this deflecting motion are characteristically represented as sawtooth waves, that is waves having slowly and linearly ascending sweep portions, and rapidly descending flyback portions which are, not necessarily but most usually, linear.

Where it is desired to produce accurate linear sweep traces such as, for example, in flying spot scanner tubes, an effective deflection system commonly comprises a conventional sawtooth wave generator connected through a feedback power amplifier to the deflection system. For electrostatic deflection systems such an arrangement is acceptable but for magnetic deflection systems the arrangement may result in irregular operation of the feedback amplifier. This is due to the fact that during the flyback portion the current in the amplifier output, that is the deflection coil decreases sinusoidally while the conventional sawtooth waveform applied to the amplifier input decreases substantially linearly. The feedback signal in the amplifier resulting from the difference in input and output signal is a large pulsation which disrupts the normal operation of the amplifier during the period of the flyback portion and the critical sweep portion at the sawtooth signal. This difficulty may be overcome by using with the amplifier a sawtooth generator having a waveform with a sinusoidal flyback portion.

An object of this invention is to provide a new and improved sawtooth generator for producing a waveform having a sinusoidal flyback portion.

The invention contemplates a generator comprising a capacitor charged through one current path by a substantially constant current and discharged through a second current path which includes an inductor. The second current path is gate operated so that when open the capacitor is charged so that the capacitor voltage increases at a constant rate and when the gate is closed the capacitor is discharged so that the capacitor voltage decreases at a sinusoidal rate thereby producing a sawtooth wave having a linear sweep portion and a sinusoidal flyback portion.

One feature of the invention is a gate circuit located in the second current path comprising an asymmetrically conducting device and a low impedance gate pulse generator.

A further feature of the invention is another asymmetrically conducting device connected in the second current path to limit the current flow through the inductor during the capacitor discharge period.

Another feature of the invention is a resistor connected in shunt across the inductor to eliminate any damped parasitic oscillation that may occur in the inductor.

The invention, its objects and features will be better understood by referring to the following description and drawings forming a part thereof wherein.

Figure 1:
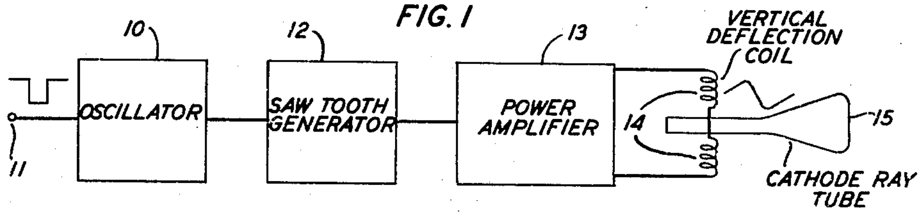
Fig. 1 is a block diagram of a cathode ray tube deflection circuit including a sawtooth generator in accordance with the invention.

Referring more particularly to the drawings, there is shown in Fig. 1, by way of example for purposes of illustration, a cathode ray tube vertical deflection circuit including an oscillator 10 which may be of the multivibrator type, the frequency of which is controlled by vertical synchronizing signals applied at the input terminal 11. These oscillations are applied to a sawtooth generator 12 wherein deflection waveforms are produced having linear sweep portions. As linearity is most easily achieved in waves of low power content which in themselves are not suited for direct application to the deflection coils of a cathode ray tube they must first be amplified through a power amplifier 13, such as that described in copending patent application to C. W. Harrison and G. Nielsen, Serial No. 400,561, filed December 28, 1953, for example. The power amplifier accepts input voltage waveforms and produces output current waveforms which are applied to the vertical deflection coil 14 of the cathode ray tube 15 wherein the beam is centered and deflected from the center position in accordance with the applied deflection currents.

Figure 2:
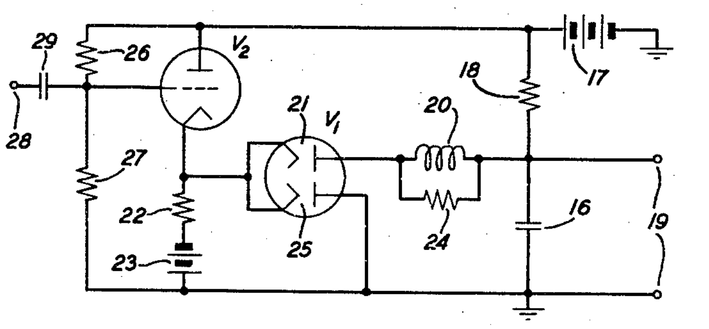
Fig. 2 shows a sawtooth generator circuit in schematic form in accordance with the invention.

The sawtooth generator in accordance with the invention is shown in Fig. 2. A capacitor 16 is charged at a constant rate by source 17. One plate of the capacitor is connected to ground potential and the other plate is connected to the positive terminal of source 17 through a large resistor 18. A pair of output terminals 19 is also connected to the plates of the capacitor. The capacitor is discharged through a series connected circuit comprising an inductor 20, a diode 21 which is one half of a double diode tube $V_1$ and the cathode resistor 22 of cathode follower tube $V_2$ to the negative terminal of a source 23. A damping resistor 24 is connected across inductor 20, and diode 25, which is the second half of tube $V_1$, has its anode connected to ground and its cathode connected to that of diode 21. The anode of tube $V_2$ is connected to the positive terminal of source 17 and the grid to the junction of resistors 26 and 27 which form a voltage divider connected between the positive terminal of source 17 and ground potential. Square wave pulses are applied to the grid at terminal 28 through coupling capacitor 29.

Figure 3A:
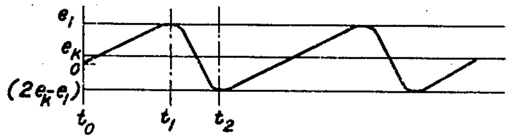
Figs. 3A, 3B and 3C are waveforms used in describing the operation of the sawtooth generator of Fig. 2.
Figure 3B:
Figure 3C:
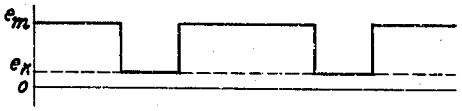

With reference to the mode of operation of the sawtooth generator of Fig. 2 the voltage across the terminals 19 increases linearly during the charging cycle from zero volts at time $t_0$ to $e_1$ volts at time $t_1$, as shown in Fig. 3A. During this period of time the cathode voltage of tube $V_2$ shown in Fig. 3C, is maintained at a voltage $e_m$, which is greater than $e_1$. At a time $t_1$ the synchronizing signal applied to the grid of tube $V_2$ causes the potenial on the cathode to fall to a value $e_K$. This potential is maintained at the cathode for a period of time at least equal to that of the flyback portion of the wave. The operating potentials are so related that the lowered cathode potential causes the diode 21 to conduct allowing a discharge current $i$ to flow through it to the negative terminal of source 23. Due to the series connected inductance and capacitance in this discharge path the current flowing therein behaves in a sinusoidal fashion. The diode 21 remains conducting until a time $t_2$ when a half cycle of oscillation has been completed and the current tries to reverse its direction of flow as shown in Fig. 3B. At this time, the diode becomes non-conducting, allowing the capacitor 16 to start charging again. As shown in Fig. 3A the voltage waveform across capacitor 16 during the time $t_1$ to $t_2$ varies sinusoidally from the maximum value of $e_1$ to a minimum value of $2e_k - e_1$. This half-cycle sine wave is centered about the cathode potential $e_k$ so that the net driving voltage in the circuit at the time $t_1$ is $e_1 - e_k$ volts.

The diode 25 is connected into the discharge circuit to act as a limiter for the current drawn through the inductor 20 thereby assuring a substantially constant sinusoidal oscillation.

Due to the stray capacitance between the inductor 20 and ground and the distributed capacitance of the inductor itself, a damped parasitic oscillation occurs in the inductor just after the diode 21 becomes non-conducting. These oscillations cause a minor disturbance in the sawtooth wave being generated and are eliminated by a shunt resistor 24 connected across the inductor.

One important advantage of the arrangement is that the current discharge path responds instantaneously to the synchronizing signals thereby insuring precision timed switching and accurate sawtooth waves.

Another important advantage is that the damping resistor across the inductor provides damping for the parasitic mode oscillations thereby insuring a smooth shaped sawtooth waveform.

A further important advantage is that due to the inclusion of a second diode in the discharge path the maximum current flow through the inductor is maintained constant independent of any fluctuations in the amplitude of the synchronizing signal.

While there are a number of possible values suitable for use in the circuit elements, by way of example the values used in actual practice in the embodiment of the invention shown in Fig. 3 are:

$V_1$—6AL5
$V_2$—396A (Western Electric)
16—.04 microfarads
17—300 volts
18—3 megohms
20—1.6 henries
22—.15 megohm
23—300 volts
24—.51 megohm
26—.12 megohm
27—.12 megohm
29—1 microfarad It is understood that the above-described arrangements are illustrative of the application of the principles of the invention. Numerous other arrangements might be devised by those skilled in the art without departing from the spirit or scope of the invention.

What is claimed is:

1. A sawtooth generator comprising a first source of constant potential and a second source of constant potential each having a positive terminal and a negative terminal, a charging capacitor, means including a first resistor connecting one plate of said capacitor to the positive terminal of said first source and means for connecting the other plate of said capacitor to the negative terminal of said first source and to the positive terminal of said second source whereby said capacitor is charged at a constant rate, an electron discharge device including an anode, a cathode and a grid, means for connecting the anode to the positive terminal of said first source, means including a second resistor for connecting said cathode to the negative terminal of said second source, means for applying a gating pulse to said grid, means including a series connected asymmetrically conducting device and inductor connected between said cathode and the junction of said first resistor and said capacitor, said asymmetric device conducting only during the period of said gate pulse whereby said capacitor is discharged through said inductor, asymmetrically conducting device and second resistor, said discharge voltage waveform being sinusoidal in form, and output terminals connected respectively to the plates of said capacitor.

2. A sawtooth wave generator according to claim 1 in further combination with a third resistor connected in parallel with said inductor to damp parasitic oscillations therein.

3. A sawtooth wave generator according to claim 2 in further combination with another asymmetrically conducting device connected between said cathode and said other plate of said capacitor to permit a flow of current to said cathode whereby the current flow through said inductor is limited.

4. A saw-tooth wave generator comprising a constant potential source having a positive terminal and a negative terminal, a charging condenser, means for connecting one plate of said condenser to said positive terminal and the other plate of said condenser to said negative terminal for charging said condenser at a constant rate, and means responsive to an external source of signals for discharging said condenser at a sinusoidal rate, said means comprising an inductor, an asymmetrically conducting device and a resistance connected in series between said one plate and the negative terminal of said source, and a low impedance signal generator connected in series between said asymmetrically conducting device and said positive terminal for causing said asymmetrically conducting device to conduct whereby said charging condenser is discharged.

5. A saw-tooth wave generator according to claim 4 in further combination with a resistance element connected in parallel with said inductor to damp parasitic oscillations.

References Cited in the file of this patent

UNITED STATES PATENTS

| | | |
|---|---|---|
| 2,063,025 | Blumlein | Dec. 8, 1936 |
| 2,084,157 | McLennan | June 15, 1937 |
| 2,522,957 | Miller | Sept. 19, 1950 |
| 2,540,820 | Gruen | Feb. 6, 1951 |
| 2,594,104 | Washburn | Apr. 22, 1952 |